March 28, 1961 W. A. J. VAN JAARSVELT 2,977,548
OSCILLATOR CIRCUIT WITH PARASITIC OSCILLATION PREVENTION MEANS
Filed April 6, 1959

INVENTOR.
Willem A. J. Van Jaarsvelt
and Pieter De Waard
BY
Watson, Cole, Grindle & Watson
ATTORNEYS

United States Patent Office 2,977,548
Patented Mar. 28, 1961

2,977,548

OSCILLATOR CIRCUIT WITH PARASITIC OSCILLATION PREVENTION MEANS

Willem A. J. van Jaarsvelt, Delft, Netherlands, assignor to The Nederlandse Organisatie voor Toegepast-Natuurwetenschappelijk Onderzoek ten behoeve van Nijoerheid, Handel en Verkeer, The Hague, Netherlands, a corporation of the Netherlands Filed Apr. 6, 1959, Ser. No. 804,528

Claims priority, application Netherlands Apr. 10, 1958

2 Claims. (Cl. 331—105)

The invention relates to an oscillator circuit, suitable, for example, for purposes of feeding a condenser measuring bridge and in which an LC circuit determines the frequency produced.

An object of the invention is an oscillator circuit, which does not oscillate in a parasitary way.

A further object of the invention is an oscillator circuit with an electrostatic coupling which is as weak as possible between the LC circuit which determines the frequency and the other elements of the generator circuit.

This is especially important if the oscillator circuit is used for purposes of feeding a condenser measuring-bridge, in which parasitary capacitances can get into a position which is parallel to one or more of the bridge capacitances, in consequence of the above-mentioned electrostatic coupling.

Yet another object of the invention is an oscillator circuit the output of which is practically unloaded by parasitary capacitances.

A further object of the invention is a condenser measuring bridge in which the oscillator circuit is incorporate.

According to this invention the circuit determining the frequency is coupled to a winding on the middle leg of a transformer core having three legs. On each of the outer legs lies a winding, both windings being connected in parallel. On at least one of the outer legs lies an extra winding. The pair of windings which are connected in parallel and the extra winding are incorporate in an electronic tube circuit, which is provided with an anode circuit and a grid circuit.

The pair of windings is incorporate in the grid circuit and the extra winding is incorporate in the anode circuit. The winding direction is chosen in such a way, that, if the middle leg is left out, the induced voltages of two coils that are connected in parallel counterbalance each other, so that between anode-winding and grid-windings no coupling occurs. The same state of things can be brought about in the presence of the middle leg, if a short-circuited winding lies round this middle leg, which winding may consist, for instance, of one single turn.

If, to the contrary, the winding on the middle leg is open, variations in anode current may excite a fluctuating magnetic field in the middle leg and the winding direction of the anode and the grid coils being correctly chosen, positive feed back is caused in consequence of the fluxes in the two grid coils being different.

According to the invention the winding on the middle leg may be connected to two points situated on either side of the electrical centre of a coil, the ends of which are connected to a condenser. As viewed from the winding on the middle leg this circuit has a high impedance for the resonance frequencies, the impedance for the frequencies lying outside it being low, so that here it substantially works as a short circuit.

As a result of this the circuit will be capable of oscillating in the resonance frequency of the circuit that is connected to the winding on the middle leg and will show no tendency to generate parasitary frequencies.

By positioning the points of the coil, to which the winding on the third leg is connected, near the electrical centre of the coil of the oscillating circuit, the influence of the parasitary capacitances may be considerably reduced. This is particularly important if the condenser which is connected to the coil, is formed by a bridge circuit constructed of four condensers, one diagonal of which bridge circuit is connected to the ends of the coil.

The invention is further illustrated below with the aid of drawings showing three embodiments of the generator circuit and its application to a measuring bridge.

Figure 3:
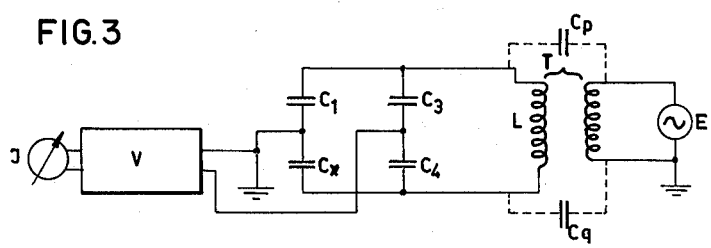

Figure 3 serves as an illustration of the influence of the parasitary capacitances in a measuring bridge which is fed by a generator via a transformer.

Figure 1:
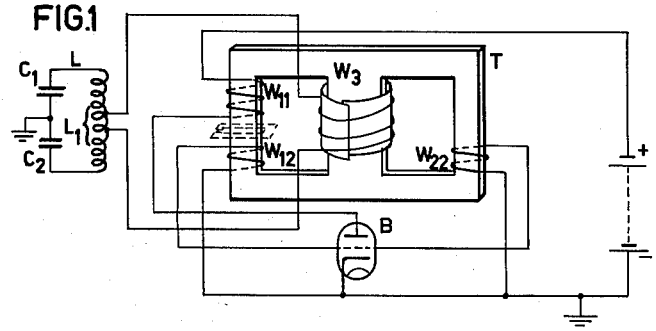
Figure 1 shows a generator circuit with one tube.

The principle of the oscillator circuit is shown in Figure 1. The frequency determining element of the circuit of Figure 1, is the circuit which is formed by the coil L and the series connection of the capacitances $C_1$ and $C_2$. In order to demonstrate the purpose of the circuit more clearly, the connecting point of the capacitances $C_1$ and $C_2$ has been drawn as earthed. On the coil L a point is then to be found, the voltage of which with regard to earth is zero. A very small part $L_1$ of the coil L, placed in a position which is as symmetrical as possible with regard to said point of earth potential, is connected to the winding $W_3$ of a transformer T. This winding $W_3$ is situated on the middle leg of the three-legged transformer core. The winding $W_3$ has very few turns, for instance only one. The transformer core is earthed, or, if this is impossible, provided with an earthed screen round the middle leg. The winding $W_3$ is carried out in such a way as to have only a small capacitance with regard to earth. The parasitary capacitances of $W_3$ to earth should be imagined as connected between the ends of the part $L_1$ of the coil L and earth. Their influence on the distribution of the voltage over the capacitances $C_1$ and $C_2$ is to be found by calculating their transformed values between the ends of the coil and earth.

This value is a factor $$\sqrt{\frac{L_1}{L}}$$

smaller, if the coupling factor between the windings of the coil L is supposed to be 1. From this explanation it is evident, that the influence of the capacitance between $W_3$ and earth on the distribution of the voltage over the capacitances $C_1$ and $C_2$ may be considerably reduced.

The outer legs of the core of the transformer T have the windings $W_{11}$ and $W_{12}$, and $W_{22}$. The capacitances with which these windings are unavoidably loaded, also become noticeable in the circuit in their transformed state, however, only immediately between the ends of the coil L, so that they do influence the frequency of the voltage excited, but do not influence the distribution of the voltage over the capacitances $C_1$ and $C_2$.

The winding $W_{11}$ of the transformer is incorporated in the anode circuit of the tube B, the windings $W_{12}$ and $W_{22}$ are connected in parallel and are incorporated in the grid circuit of tube B. Those particular details of the circuit, which are not necessary for a clear understanding, as, for instance, means for obtaining a limitation of the amplitude of the oscillation produced, have been omitted. The connection of the windings is such, that, if the middle leg of the transformer core is mentally left out, the induced voltages of two coils which are connected in parallel counterbalance each other.

The current running through the winding $W_{11}$ cannot induce any voltages in the windings $W_{12}$ and $W_{22}$ as the directions of flux in these windings are opposite.

The virtual removal of the middle leg of the transformer core can be effected for alternating flux by short circuiting the winding on this middle leg, so that in said leg substantially no magnetic alternating flux can occur.

If the coil on the middle leg is open, the fluxes in the outer legs of the core are no longer equal, so that a positive feedback is produced between the anode circuit and the grid circuit.

A much lower voltage is then induced in the winding $W_{22}$, because the flux which is excited by the current in $W_{11}$ to a large extent finds its way through the middle leg.

The circuit can then function as a so-called "blocking oscillator."

The circuit can, therefore, be made to be stable or unstable, according as the winding round the middle leg of the transformer core is shortcircuited or not.

As a result of a parallel LC circuit being connected to the winding which lies around the middle leg, this winding is practically shortcircuited for all frequencies, except for the resonance frequency of the circuit, so that the oscillator circuit will be capable of oscillating in this frequency. The advantage of this oscillator circuit as compared with similar circuits as for instance the Meissner oscillator circuit, is, that the circuit according to this invention shows much less tendency towards parasitary oscillation, as there exists practically no positive feed back for frequencies other than those generated.

Figure 2:
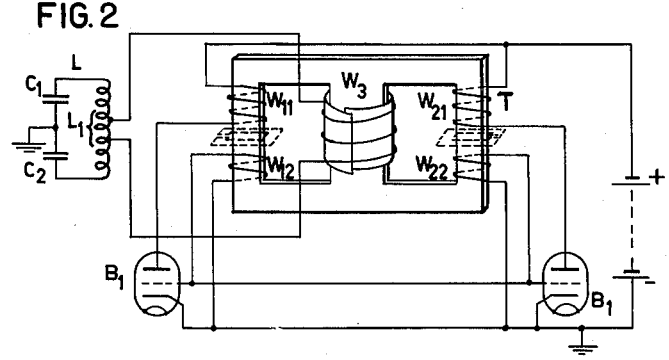
Figure 2 is a similar circuit with two tubes.

Further it is also possible to carry out the circuit with two tubes, as in Figure 2. As the currents and voltages of the two tubes $B_1$ and $B_1'$ are in phase, both tubes substantially work in parallel In Figure 3 a bridge of capacitances with the capacitances $C_1$, $C_x$, $C_3$ and $C_4$ is shown. The capacitances of $C_3$ and $C_4$ are equal and the point of connection of the capacitances $C_1$ and $C_x$ has here been earthed. The voltage between earth and the point of connection of $C_3$ and $C_4$ is led to the input of an amplifier V in the output of which an indicator I is embodied. The parasitary capacitances $C_p$ and $C_q$ between the primary and the secondary of the transformer T are in fact parallel to the capacitances $C_1$ and $C_x$ respectively.

As these parasitary capacitances are not stable, i.e. that their value is not constant, they can give rise to mistakes in measuring. If the bridge capacitances are of the order of 100 micro-microfarads, the capacitances $C_p$ and $C_q$ of the order of 10 micro-microfarards with an unstability of for instance 5%, the influence on the stability of the bridge is of the order of 0.5 to 1% of $C_1$ or $C_x$.

When a stability of $10^{-4}$ to $10^{-5}$ is required of the bridge capacitances, this means, that the values of $C_p$ and $C_q$ should be reduced as strongly as possible.

In particular the capacitance between the windings of the transformer is usually fairly dependent on temperature, so that the contribution of this transformer to the capacitances $C_p$ and $C_q$ should be as small as possible. This is effected by carrying out the known transformer-coupling of Figure 3 in the manner represented in the Figures 1 and 2.

What we claim is:

1. Oscillator circuit, in which the frequency of the alternating voltage excited is determined by a parallel LC circuit, wherein this circuit is coupled to a winding on the middle leg of a transformer having a three-legged core, which core comprises one winding on each outer leg, both these windings being connected in parallel to one another, and which core further comprises an extra winding on at least one outer leg, and whereby the pair of windings that are connected in parallel as well as the extra winding are incorporate in an electronic tube circuit which is provided with an anode circuit and a grid circuit, whereby the pair of windings is incorporate in the grid circuit and the extra winding in the anode circuit, and whereby the winding directions have been selected in such a way, that the circuit is stable when the winding on the middle leg is short-circuited, and unstable when the winding on the middle leg is open.

2. Oscillator circuit according to claim 1, wherein the windings on the outer legs of the transformer core are incorporate in the anode circuit and the grid circuit of two tubes, and whereby the control electrodes of the tubes are linked together..

References Cited in the file of this patent

UNITED STATES PATENTS

| | | |
|---|---|---|
| 1,340,193 | Vreeland | May 18, 1920 |
| 1,494,935 | Scriven | May 20, 1924 |
| 2,370,818 | Silverman | Mar. 6, 1945 |
| 2,554,087 | Breimer | May 22, 1951 |

UNITED STATES PATENT OFFICE
CERTIFICATE OF CORRECTION

Patent No. 2,977,548                         March 28, 1961

Willem A. J. van Jaarsvelt

It is hereby certified that error appears in the above numbered patent requiring correction and that the said Letters Patent should read as corrected below.

In the grant, lines 2, 3 and 4, and 14, 15 and 16, and in the heading to the printed specification, lines 5, 6 and 7, name of assignee, "The Nederlandse Organisatie voor Toegepast-Natuurwetenschappelijk Onderzoek ten behoeve van Nijoerheid, Handel en Verkeer" read -- The Nederlandse Organisatie voor Tòegepast-Natuurwetenschappelijk Onderzoek ten behoeve van Nijverheid, Handel en Verkeer --.

Signed and sealed this 14th day of November 1961.

(SEAL)
Attest:

ERNEST W. SWIDER
Attesting Officer

DAVID L. LADD
Commissioner of Patents